United States Patent
Jiang et al.

(10) Patent No.: US 8,299,379 B2
(45) Date of Patent: Oct. 30, 2012

(54) PORTABLE ELECTRONIC DEVICE

(75) Inventors: Bin Jiang, Shenzhen (CN); Man-Zhong Wang, Shenzhen (CN); Te-Hua Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 262 days.

(21) Appl. No.: 12/834,023

(22) Filed: Jul. 12, 2010

(65) Prior Publication Data

US 2011/0222213 A1 Sep. 15, 2011

(30) Foreign Application Priority Data

Mar. 15, 2010 (CN) .......................... 2010 1 0124118

(51) Int. Cl.
*H01H 13/50* (2006.01)

(52) U.S. Cl. ..................... 200/296; 200/43.04; 200/341; 200/343

(58) Field of Classification Search ............... 200/43.01, 200/43.04, 43.07, 296, 302.1, 302.2, 330, 200/331, 341–345, 520

See application file for complete search history.

(56) References Cited

U.S. PATENT DOCUMENTS

| 3,676,750 | A | * | 7/1972 | Hawks ........................ 361/679.4 |
| 4,191,871 | A | * | 3/1980 | Coyle ............................ 200/530 |
| 4,701,581 | A | * | 10/1987 | Wodnicki et al. ........... 200/52 R |
| 5,788,060 | A | * | 8/1998 | Kuroda ........................ 200/343 |
| 5,813,520 | A | * | 9/1998 | Reier et al. .................... 200/343 |
| 7,221,360 | B2 | * | 5/2007 | Defuans et al. ............... 345/179 |
| 7,342,192 | B2 | * | 3/2008 | Yin et al. ...................... 200/296 |
| 7,381,919 | B1 | * | 6/2008 | Yu et al. ........................ 200/296 |
| 7,485,820 | B2 | * | 2/2009 | Zhang et al. .................. 200/296 |
| 8,094,437 | B2 | * | 1/2012 | Guo et al. ................. 361/679.01 |
| 2007/0088406 | A1 | * | 4/2007 | Bennett et al. .................. 607/60 |
| 2009/0223797 | A1 | * | 9/2009 | Lai ............................... 200/343 |
| 2010/0101925 | A1 | * | 4/2010 | Tao et al. ...................... 200/345 |

* cited by examiner

*Primary Examiner* — Michael Friedhofer
(74) *Attorney, Agent, or Firm* — Altis Law Group, Inc.

(57) ABSTRACT

A portable electronic device includes a main body and a stylus. The main body includes a shell and a reset button received in the shell. A sidewall of the shell defines a through hole. The reset button includes a pressing pole received in the through hole. The pressing pole is concave with respect to an outer surface of the shell. The stylus is operable to be inserted into the through hole to press the button.

5 Claims, 3 Drawing Sheets

PORTABLE ELECTRONIC DEVICE

BACKGROUND

1. Technical Field

The present disclosure relates to electronic devices and, particularly, to a portable electronic device.

2. Description of Related Art

Many portable electronic devices include a reset button for resetting when the electronic device has crashed. This reset button that usually protrudes from the electronic devices for facilitating users' operations may be depressed by mistake.

Therefore, it is desirable to provide a portable electronic device that can overcome the above-mentioned limitations.

BRIEF DESCRIPTION OF THE DRAWINGS

Many aspects of the embodiments would be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
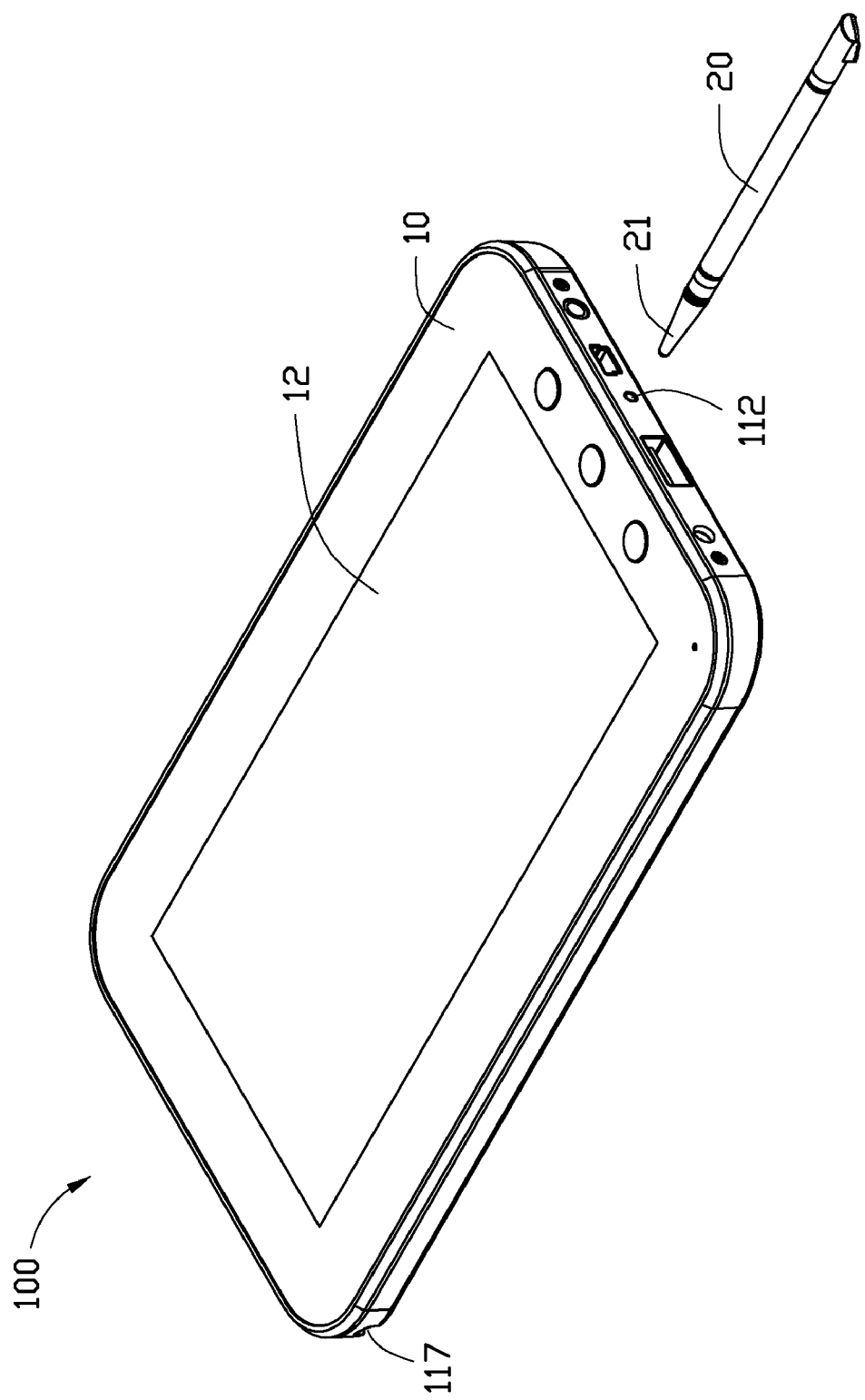
FIG. 1 is an isometric view of a portable electronic device, according to an exemplary embodiment.

Referring to FIG. 1, a portable electronic device 100, according to an exemplary embodiment, includes a main body 10 and a stylus 20 received in the main body 10.

Figure 2:
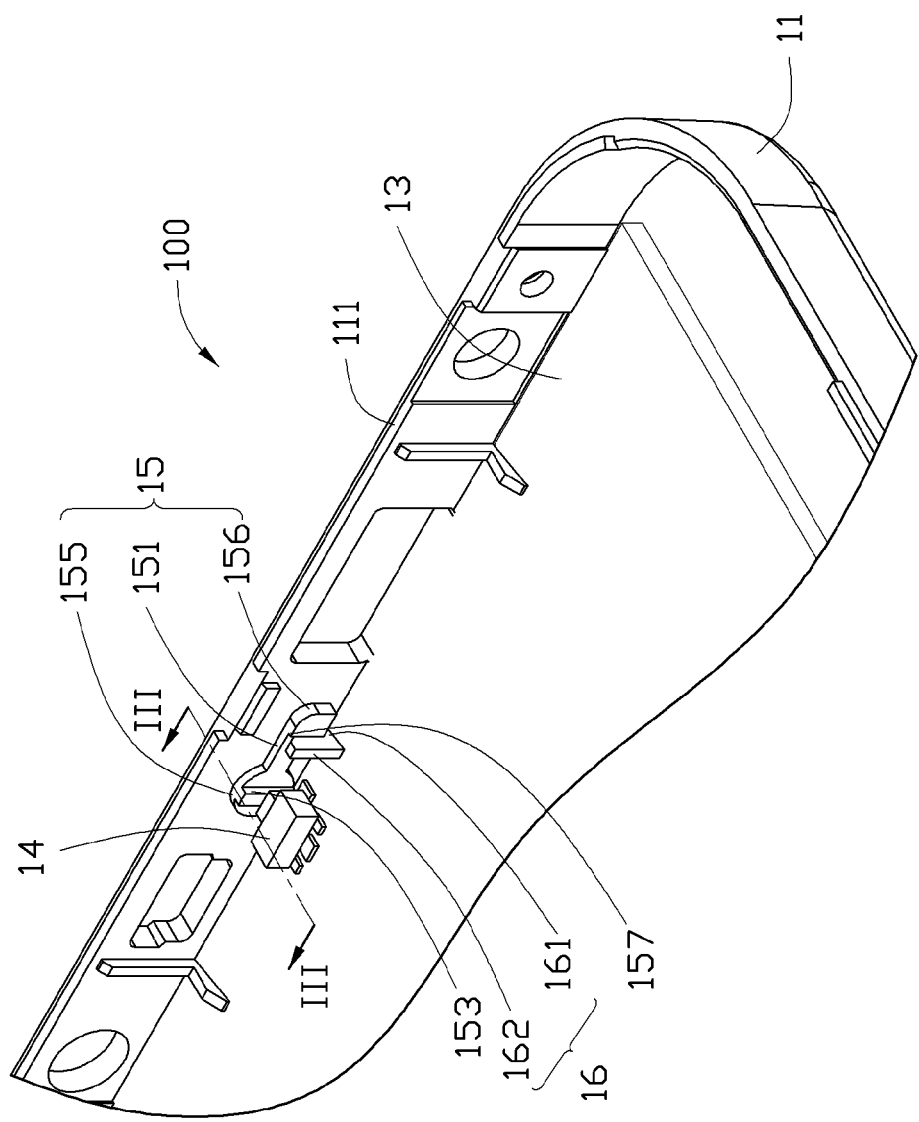
FIG. 2 is a partial, enlarged view of the portable electronic device of FIG. 1.
Figure 3:
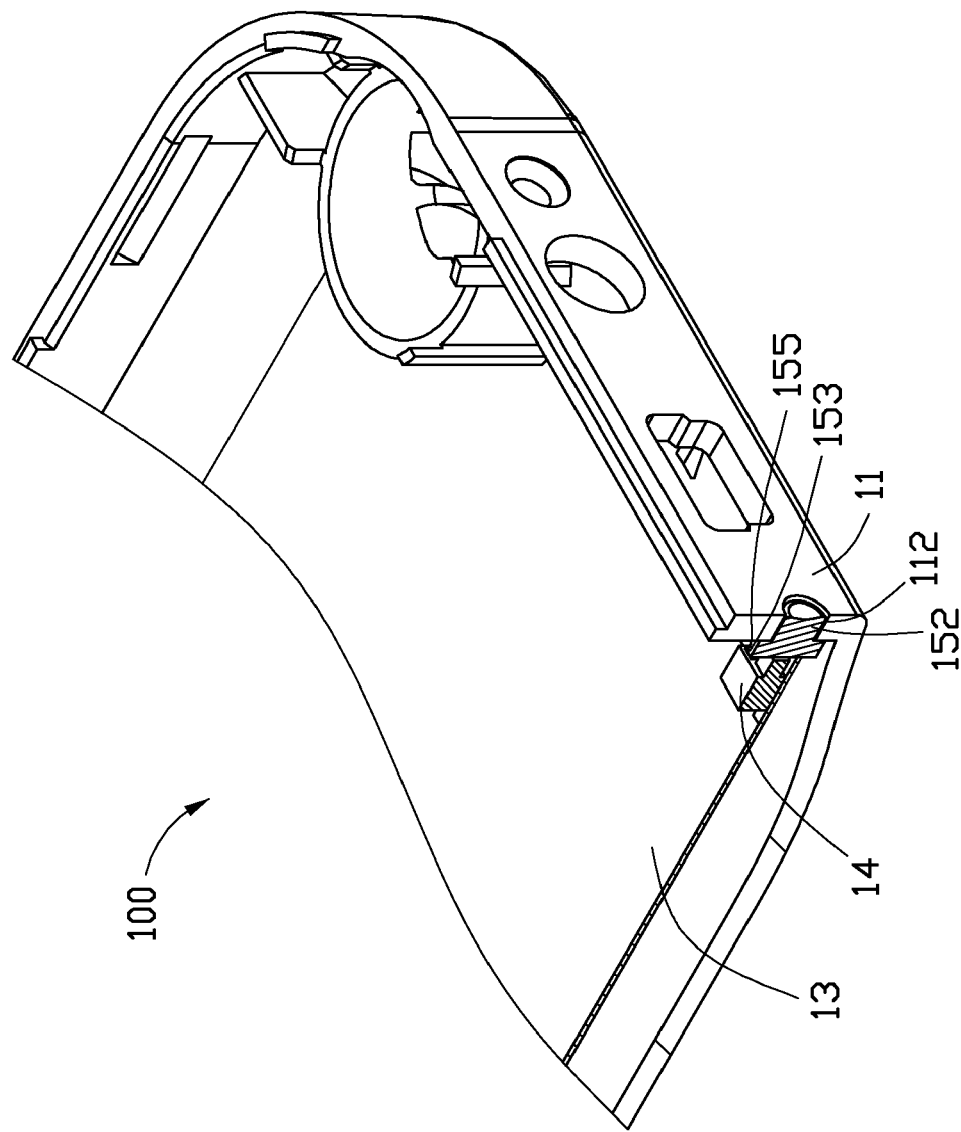
FIG. 3 is a partially exploded view of the portable electronic device taken along line III-III of FIG. 2.

Also referring to FIG. 2 and FIG. 3, the main body 10 includes a shell 11, a touch screen 12, a circuit board 13, a triggering switch 14, and a reset button 15. The touch screen 12 is disposed on the shell 11 and configured for generating input signals in response to the operation of the stylus 20 on the touch screen 12. The circuit board 13, the triggering switch 14, and the reset button 15 are all received in the shell 11. The shell 11 includes a sidewall 111 defining a through hole 112 and a receiving groove 117 (see FIG. 1). An L-shaped buckle 16 is fixed to the inner surface of the sidewall 111 adjacent to one side of the through hole 112. The buckle 16 has a first portion 161 and a second sortion 162. The first portion 161 is connected to the sidewall 111, and the second portion 162 is substantially perpendicular to the first portion 161 and is spaced a distance with the sidewall 111.

The reset button 15 includes a base plate 151, a pressing pole 152, and a protrusion 153. The base plate 151 is deformed elastically and includes a first end 155 and a second end 156 opposite to the first end 155. The pressing pole 152 and the protrusion 153 are disposed on two opposite surfaces of the first end 155 respectively. The pressing pole 152 is slidably received in the through hole 112. The length of the pressing pole 152 is shorter than the depth of the through hole 112 and thus the pressing pole 152 is concave with respect to an outer surface of the shell 11 to prevent the reset button 15 from being pressed by mistake. The protrusion 153 turns towards the trigger button 14 and is configured for triggering the triggering switch 14. The second end 156 is received in the buckle 16 and thus is configured for fixing the reset button 15 to the inner surface of the sidewall 111. In the present embodiment, the second end 156 has an extended fringe 157 extending away from the sidewall 111, and the extended fringe 157 resists against an intersection of the first portion 161 and the second portion 162 to couple with the buckle 16. It can be understood that in other alternative embodiment, the second end 156 can define (not shown) a slot in the surface away from the sidewall 111 for receiving the buckle 16 therein.

The stylus 20 can be fixedly inserted into the receiving groove 112. The stylus 20 includes a tapered nib 21. A diameter of the nib 21 is smaller than the diameter of the through hole 112 and thus the nib 21 can be inserted into the through hole 112 to press on the reset button 15.

In use, if the portable electronic device 100 needs to be reset, the nib 21 is inserted into the through hole 112 to press on the pressing pole 152 and thus the base plate 151 is bent. Therefore, the protrusion 153 is moved towards the triggering switch 14 and thus the triggering switch 14 is depressed. As such, the portable electronic device 100 is reset. Then, the stylus 20 is removed from the through hole 112. The base plate 151, the pressing pole 152 and the protrusion 153 restores. As a result, the switch is released.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A portable electronic device comprising:
   a main body comprising:
      a shell having a sidewall defining a through hole;
      a reset button received in the shell, the reset button comprising:
         a base plate capable of being deformed elastically, the base plate comprising a first end and a second end opposite to the first end, wherein the second end has an extended fringe extending away from the sidewall;
         a pressing pole received in the through hole, positioned on the first end, and concave with respect to an outer surface of the shell; and
         an L-shaped buckle having a first portion and a second portion, the first portion fixed to the sidewall, the second portion substantially perpendicular to the first portion and spaced a distance from the sidewall, wherein the extended fringe resists against an intersection of the first portion and the second portion to couple with the buckle, and thus to prevent the second end breaking away from the buckle; and
   a stylus operable to be inserted into the through hole to press on the button.

2. The portable electronic device in claim 1, wherein the main body comprises a circuit board and a triggering switch received in the shell, the triggering switch is disposed on the circuit board corresponding to the reset button, when the pressing pole is pressed by the stylus, the triggering switch is triggered by the reset button and thus the electronic device is reset.

3. The portable electronic device in claim 2, wherein the reset button comprises a protrusion corresponding to the triggering switch, the protrusion and the pressing pole are disposed on two opposite surfaces of the first end.

4. The portable electronic device in claim 1, wherein the stylus comprises a tapered nib, and a diameter of the nib is smaller than the diameter of the through hole.

5. The portable electronic device in claim 1, wherein the main body comprises a touch screen disposed on the shell and configured to generate input signals in response to the operation of the stylus on the touch screen.

* * * * *